United States Patent [19]

Su

[11] Patent Number: 5,866,876

[45] Date of Patent: Feb. 2, 1999

[54] ELECTRIC OVEN

[76] Inventor: Johnson Su, P. O. Box 82-144, Taipei, Taiwan

[21] Appl. No.: 778,104

[22] Filed: Jan. 2, 1997

[51] Int. Cl.$^6$ .............................. A47J 37/04; F24C 15/02
[52] U.S. Cl. ...................... 219/388; 219/386; 99/421 V
[58] Field of Search .................................. 219/385, 386, 219/388, 389, 218, 405; 126/190, 194, 198; 99/421 P, 421 V, 419, 443 R; 49/40

[56] References Cited

U.S. PATENT DOCUMENTS

| | | | |
|---|---|---|---|
| 2,049,481 | 8/1936 | Walterspiel | 99/421 V |
| 2,581,570 | 1/1952 | Amanatides | 99/421 V |
| 4,783,132 | 11/1988 | Baus | 49/40 |
| 5,539,184 | 7/1996 | Su | 219/388 |
| 5,575,196 | 11/1996 | Masel et al. | 99/421 V |
| 5,640,981 | 6/1997 | Niemela et al. | 49/40 |
| 5,665,258 | 9/1997 | Hsu | 219/388 |

*Primary Examiner*—Teresa Walberg
*Assistant Examiner*—J. Pelham
*Attorney, Agent, or Firm*—A & J

[57] ABSTRACT

An electric oven including a base formed with a shoulder surrounding circumference of a top thereof, a disk fixedly mounted on the base, an electric heater fixedly mounted the disk, an annular member having a plurality of rollers at a circumference thereof and disposed on a top of the disk, a tray disposed on the annular member and having a tubular portion at a center thereof, a plug fixedly fitted within the tubular portion of the tray, a motor arranged within the base and having an output shaft extending upwardly out of the base and the annular member to engage with the plug, an outer housing fixedly mounted on a top of the base and surrounded by the shoulder of the base, an outer cover snugly fitted on a top of the outer housing and provided with a cylindrical protuberance having two opposite lugs at an upper end thereof and two opposite projections at a lower end thereof, an inner cover fixedly mounted on a bottom side of the outer cover, and a door having a flange at a lower edge thereof which is rotatably connected with the shoulder of the base, whereby the electric over can be easily dismantled and assembled.

2 Claims, 5 Drawing Sheets

ELECTRIC OVEN

CROSS-REFERENCE

This application is related to patent application Ser. No. 358,693, filed Dec. 19, 1994, now U.S. Pat. No. 5,539,184, granted Jul. 23, 1996.

BACKGROUND OF THE INVENTION

1. Field of the Invention

This invention is related an improved electric oven and in particular to one which can be easily dismantled and assembled.

2. Description of the Prior Art

Electric ovens are well known and commercially available. However, it has been found that the prior art electric oven for roasting hens, ducks, or the like on the market has a lot of disadvantages. First of all, it is necessary to put one's hand(s) into the electric oven in order to take out the roasted food hence often causing accident to the user when touching the oven. Another major drawback is that such an electric oven cannot be dismantled to remove the grease and other drippings extracted from food during the roasting process thereby making it very difficult to clean the oven and therefore causing much inconvenience in use.

Therefore, it is an object of the present invention to provide an improved electric oven which can obviate and mitigate the above-mentioned drawbacks.

SUMMARY OF THE INVENTION

This invention relates to an improved electric oven.

It is the primary object of the present invention to provide an improved electric oven which can be easily dismantled and assembled.

It is another object of the present invention to provide an improved electric oven which is simple in construction.

It is still another object of the present invention to provide an improved electric oven which is low in cost.

It is still another object of the present invention to provide an improved electric oven which is facile to operate.

It is a further object of the present invention to provide an improved electric oven which is fit for mass production.

Other objects of the invention will in part be obvious and in part hereinafter pointed out.

The invention accordingly consists of features of constructions and method, combination of elements, arrangement of parts and steps of the method which will be exemplified in the constructions and method hereinafter disclosed, the scope of the application of which will be indicated in the claims following.

DETAILED DESCRIPTION OF THE PREFERRED EMBODIMENT

Figure 1:
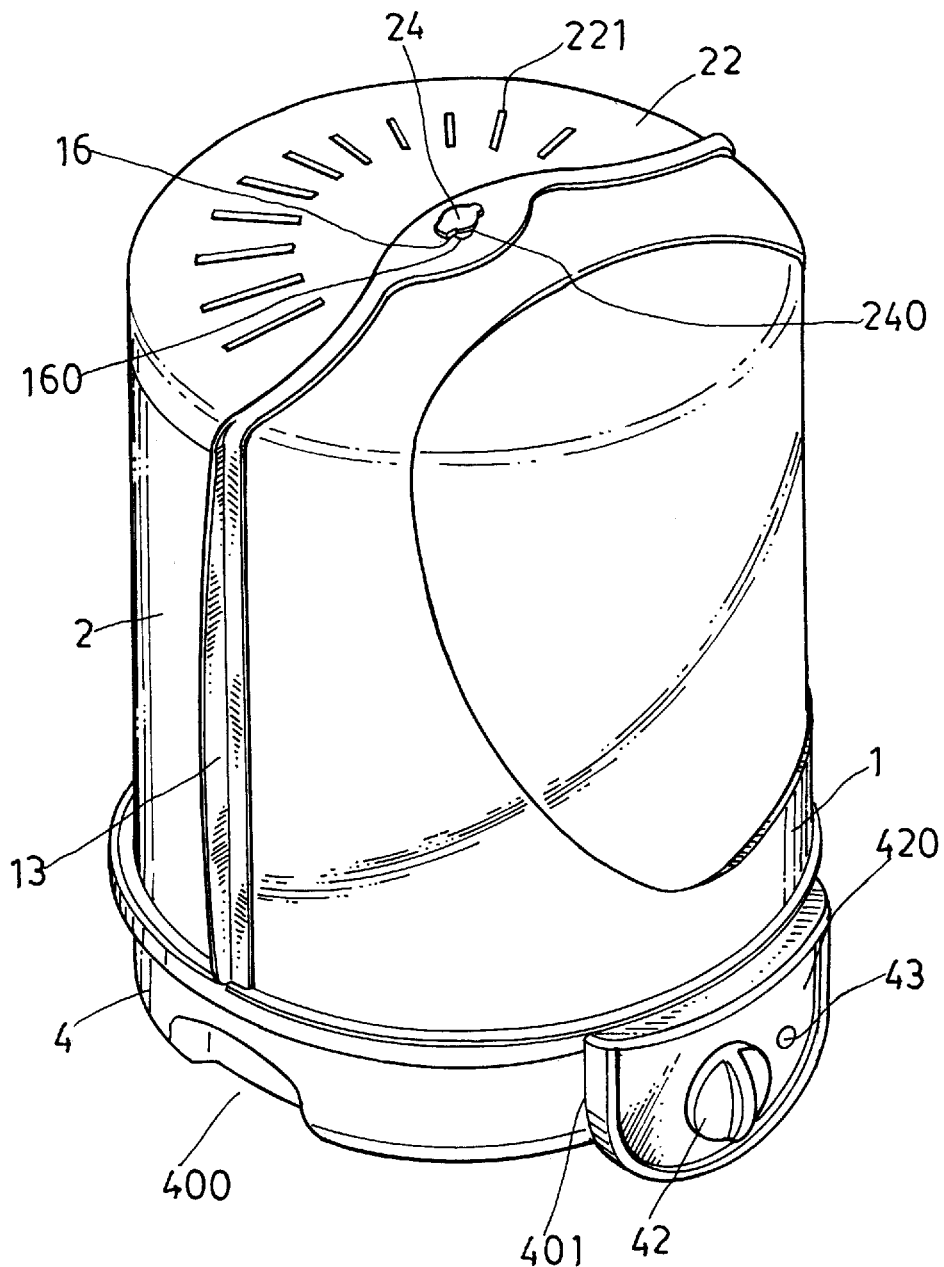
FIG. 1 is a perspective view of an electric oven according to the present invention.

For the purpose of promoting an understanding of the principles of the invention, reference will now be made to the embodiment illustrated in the drawings. Specific language will be used to describe same. It will, nevertheless, be understood that no limitation of the scope of the invention is thereby intended, such alterations and further modifications in the illustrated device, and such further applications of the principles of the invention as illustrated herein being contemplated as would normally occur to one skilled in the art to which the invention relates.

Figure 2:
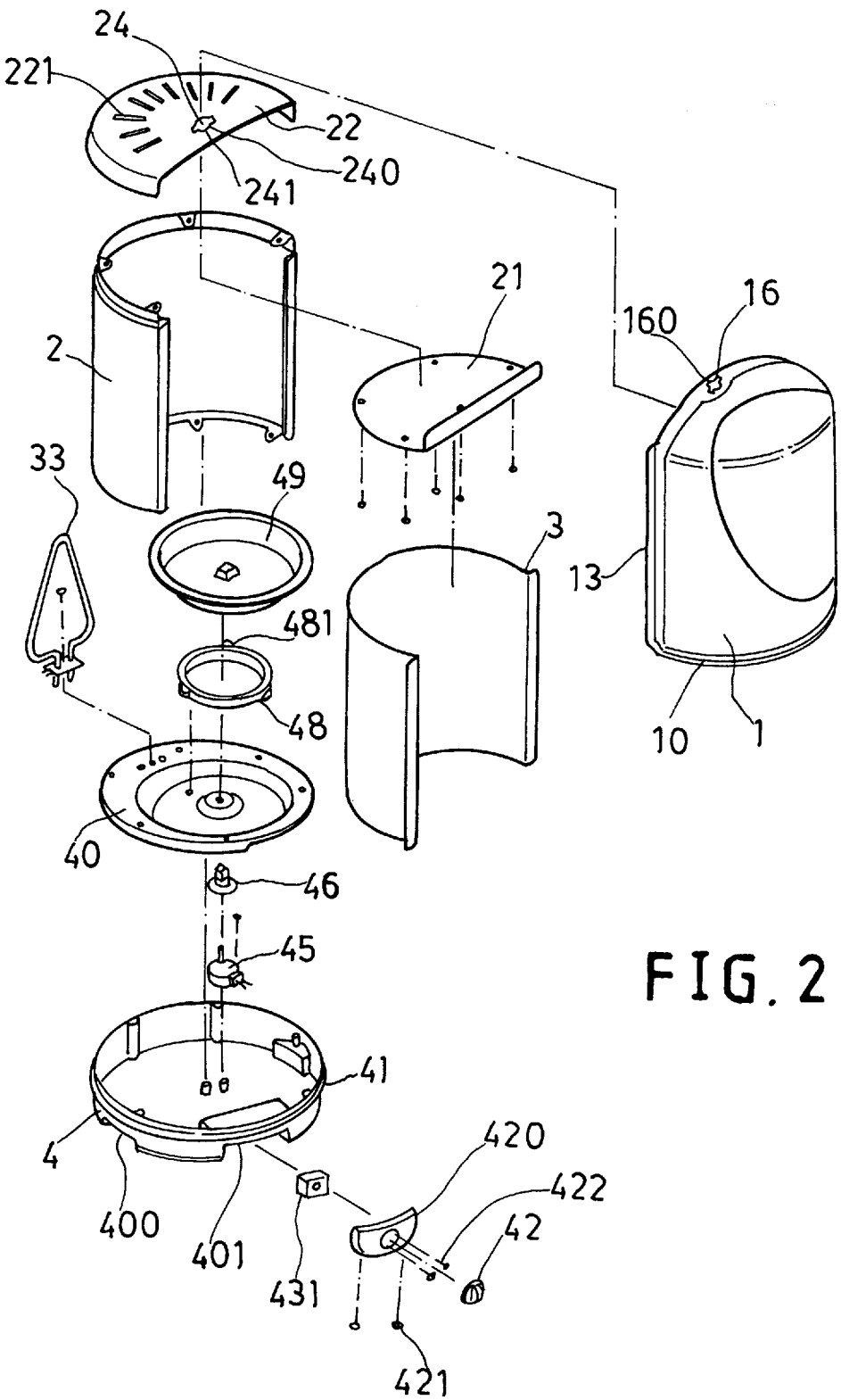
FIG. 2 is an exploded view of the electric oven.
Figure 3:
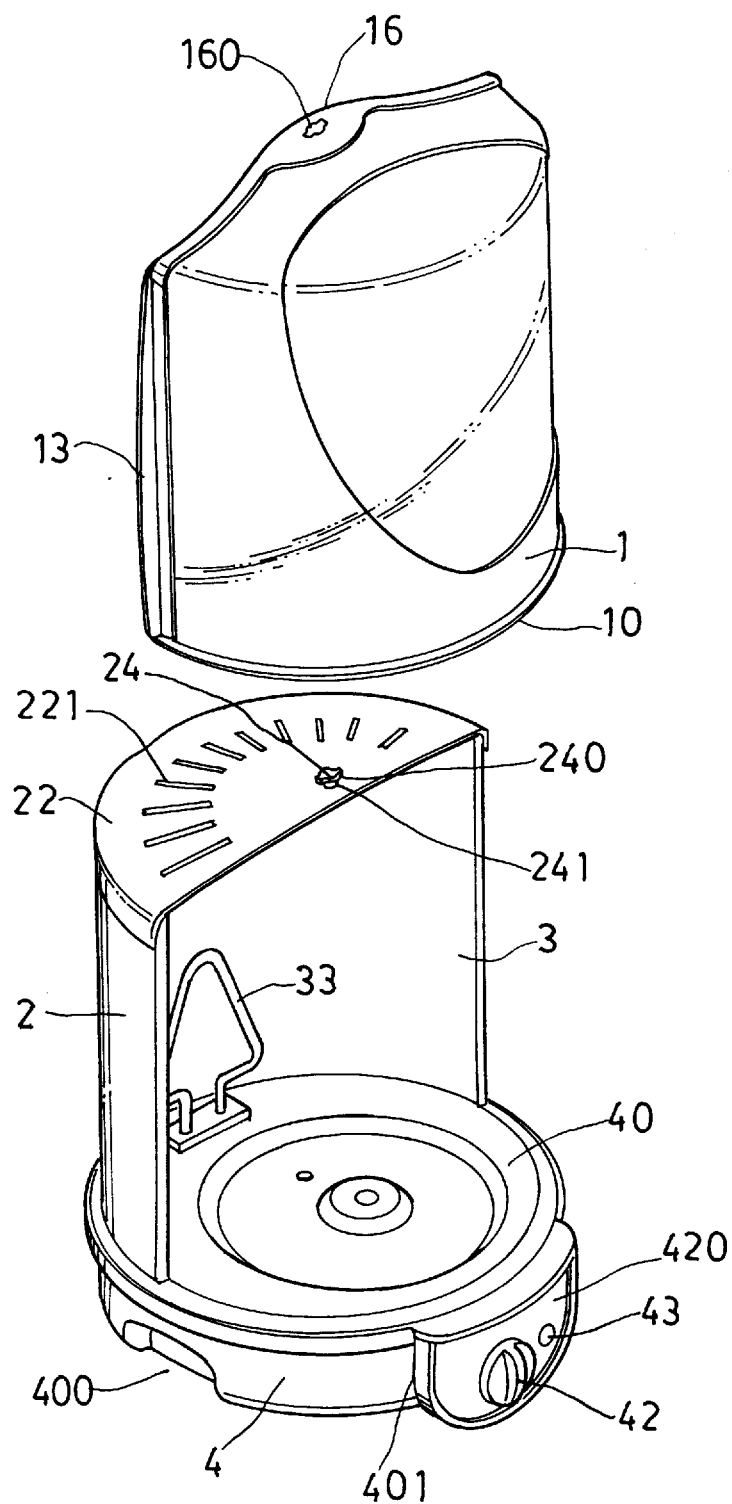
FIG. 3 illustrates how to mount the door on the electric oven.

With reference to the drawings and in particular to FIGS. 1 and 2 thereof, the electric oven according to the present invention mainly comprises a door 1, an outer housing 2, an outer cover 22, an inner cover 21, a reflector 3, a tray 49, an annular member 48, an electric heater 33, a disk 40, a plug 46, a motor 45 and a base 4. The disk 40 is fixedly mounted on the base 4. The electric heater 33 is fixedly installed on the disk 40. The annular member 48 has a plurality of rollers at its circumference and disposed on the top of the disk 40. The tray 49 is mounted on the annular member 48 and has a tubular portion at its central portion. The motor 45 is installed on the central portion of the base 4 and has an output shaft extending upwardly out of the base 4 and the annular member 48 to engage with the plug 46. The plug 46 is fixedly fitted within the tubular portion of the tray 49. The base 4 is formed a shoulder 41 around its circumference and a recess 401 in which is fitted a panel 420 on which is mounted a timer 431, a knob 42 fixedly mounted on the timer 431 and an indicator light 43. Both sides of the base 4 are formed with a cavity 400 for making it easier to be held.

Figure 4:
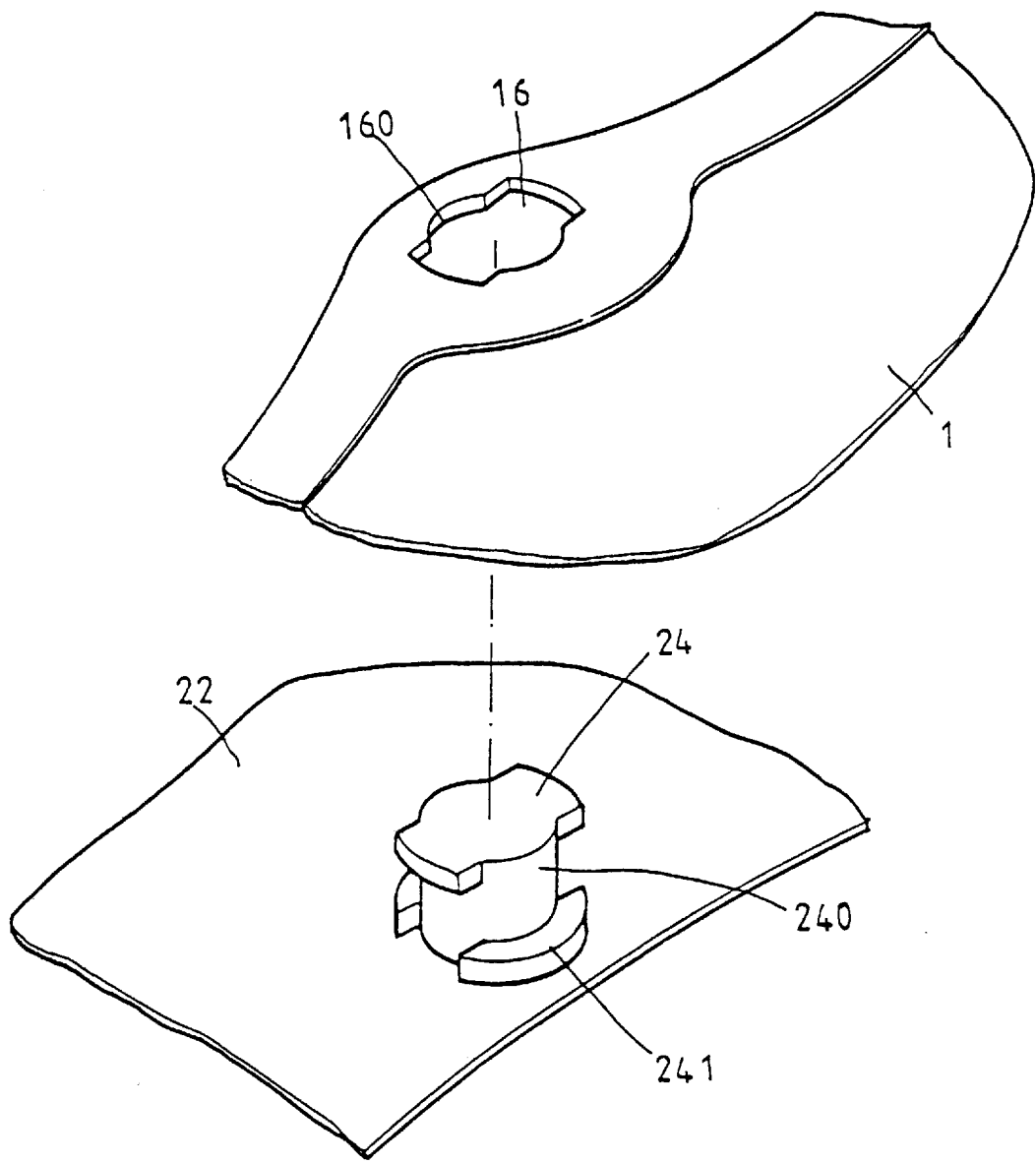
FIG. 4 illustrates how the door is engaged with the upper cover.
Figure 5:
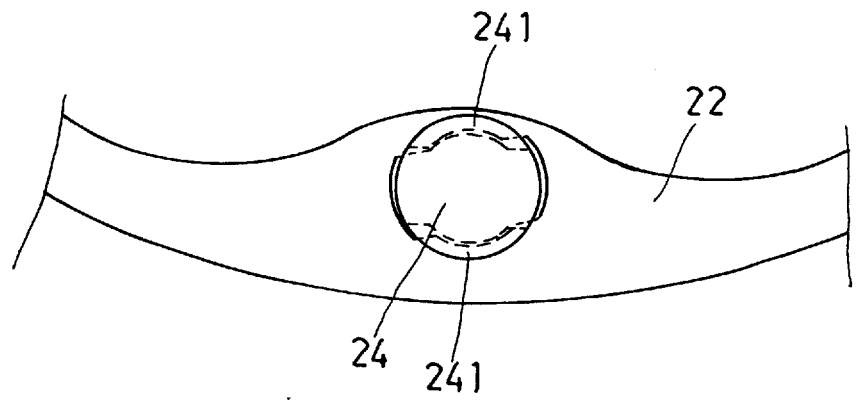
FIG. 5 is partial top plan view of the upper cover.
Figure 6:
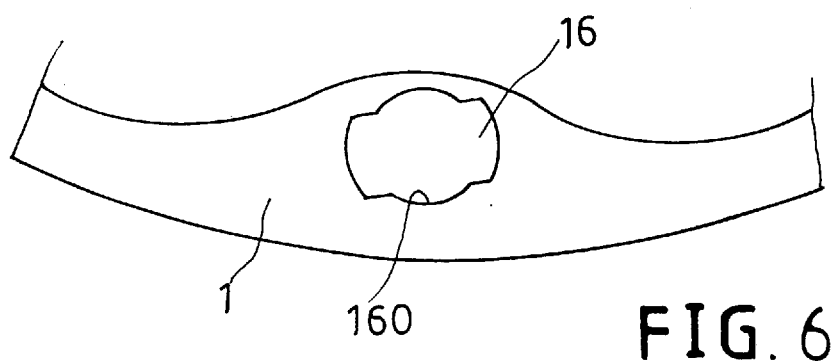
FIG. 6 is a partial top plan view of the door.
Figure 7:
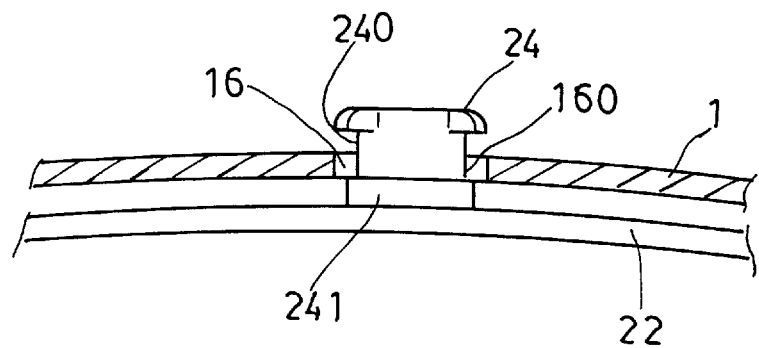
FIG. 7 is a sectional view showing the engagement between the door and the upper cover.

The outer housing 2 is a semi-cylindrical member vertically mounted on the base 4. The reflector 3 is fitted within the outer housing 2. The inner cover 21 is fixedly mounted on the bottom side of the outer cover 22. The outer cover 22 is formed with a plurality of ventilation slots 221 and snugly fitted on the top of the outer housing 2. The top of the upper cover 22 is provided at the central portion with a cylindrical protuberance 240 having two opposite lugs 24 at the upper end and two opposite projections 241 at the lower end (see FIG. 4). The door 1 is provided with a flange 10 at the lower edge and has a handle 13 at its both vertical sides and an opening 16. The door 1 is formed with an opening 19 having a central portion 160 adapted to receive the cylindrical protuberance 240 of the outer cover 22. The door 1 is rotatably connected with the shoulder 41 of the base 4 and pivotally connected with the outer cover 22.

As shown in FIGS. 4, 5, 6 and 7, the door 1 is rotatably engaged with the outer cover 22, with the opening 16 of the former receiving the cylindrical protuberance 240 of the latter, so that the door 1 can be rotated with respect to the outer housing 2.

The invention is naturally not limited in any sense to the particular features specified in the forgoing or to the details of the particular embodiment which has been chosen in order to illustrate the invention. Consideration can be given to all kinds of variants of the particular embodiment which has been described by way of example and of its constituent elements without thereby departing from the scope of the invention. This invention accordingly includes all the means constituting technical equivalents of the means described as well as their combinations.

I claim:

1. An electric oven comprising:

a base formed with a shoulder surrounding circumference of a top thereof;

a disk fixedly mounted on said base;

an electric heater fixedly mounted on said disk;

an annular member having a plurality of rollers at a circumference thereof and disposed on a top of said disk;

a tray disposed on said annular member and having a tubular portion at a center thereof;

a plug fixedly fitted within said tubular portion of said tray;

a motor arranged within said base and having an output shaft extending upwardly out of said base and said annular member to engage with said plug;

an outer housing fixedly mounted on a top of said base and surrounded by said shoulder of said base;

an outer cover snugly fitted on a top of said outer housing and provided with a cylindrical protuberance having two opposite lugs at an upper end thereof and two opposite projections at a lower end thereof;

an inner cover fixedly mounted on a bottom side of said outer cover; and a door having a flange at a lower edge thereof which is rotatably connected with said shoulder of said base, said door having an opening adapted to receive said cylindrical protuberance of said outer cover.

2. The electric oven as claimed in claim 1, wherein further comprising a reflector arranged on an inner side of said outer housing.

* * * * *